United States Patent [19]

Wittwer

[11] 4,185,866
[45] Jan. 29, 1980

[54] EXTERNAL-INTERNAL GRIPPER

[75] Inventor: Christoph F. Wittwer, Cincinnati, Ohio

[73] Assignee: Cincinnati Milacron Inc., Cincinnati, Ohio

[21] Appl. No.: 917,739

[22] Filed: Jun. 21, 1978

[51] Int. Cl.² .............................................. B66C 3/16
[52] U.S. Cl. ....................................................... 294/88
[58] Field of Search .................... 294/88, 94, 93, 97, 294/103, 104, 106, 115, 116, 118; 214/1 CM, 1 B, 1 BB; 269/32, 34, 257, 264

[56] References Cited

U.S. PATENT DOCUMENTS

| | | | |
|---|---|---|---|
| 3,790,205 | 2/1974 | Wenz | 294/88 |
| 3,945,676 | 3/1976 | Asamoto | 294/88 |

*Primary Examiner*—James B. Marbert
*Attorney, Agent, or Firm*—Thomas M. Farrell; James D. Liles

[57] ABSTRACT

A compact, internal-external gripper apparatus for use with an industrial robot utilizes a sliding block actuated toggle linkage to apply an input force to a pair of finger supports in a fully enclosed housing. Pressure is selectively supplied to each end of the sliding block to reciprocably move it along an internal way system with a unidirectional spring assist in the workpiece clamping position.

11 Claims, 4 Drawing Figures

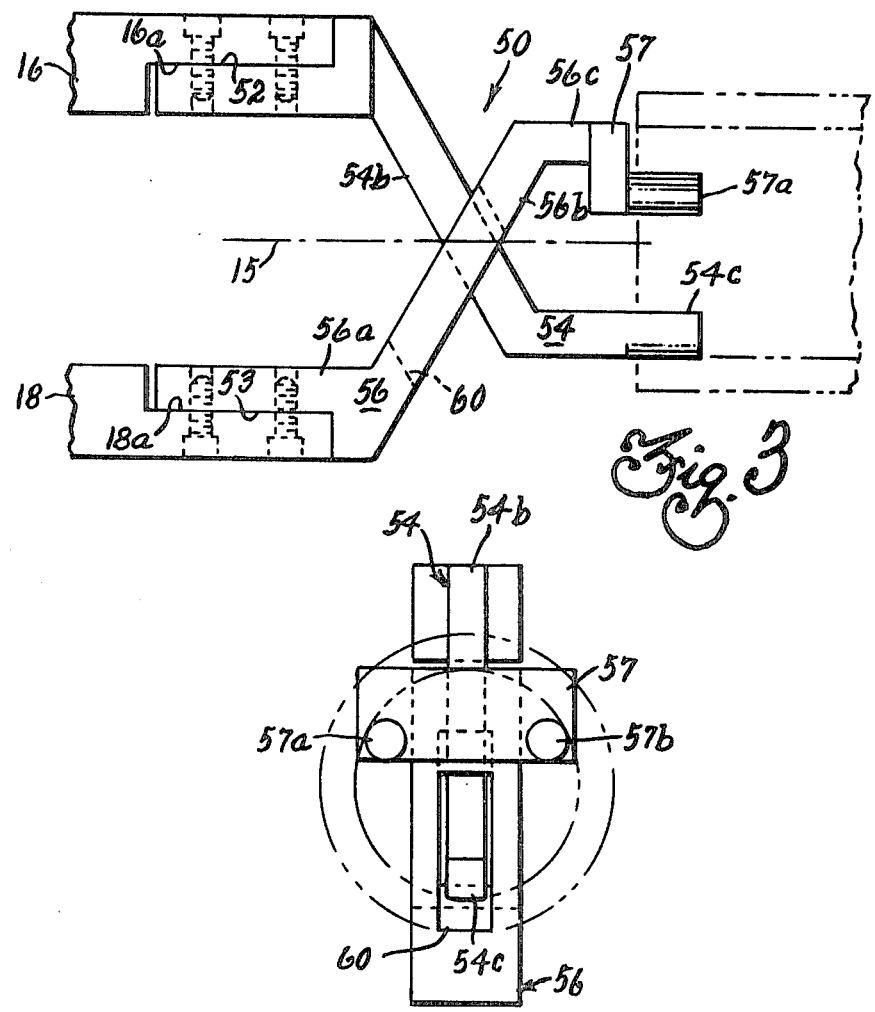

EXTERNAL-INTERNAL GRIPPER

BACKGROUND

The invention generally to gripping apparatus and more particularly concerns a finger type gripping apparatus which is intended to be attached to the end of an industrial robot or manipulator.

The rapid growth and increasing importance of manipulators or industrial robots into an expanding range of part handling applications has emphasized the need for improved grippers or gripping apparatuses. The gripping apparatus is used in association with a manipulator to interface with the workpiece which is being handled and necessarily plays a integral part in the successful solution of any robot implemented workhandling assignment.

Of the many types of grippers which have been available in the past, the most widely utilized is the finger type in which a plurality of mechanical fingers coact to selectively grasp and release a workpiece. In many applications, the prior art grippers have lacked flexibility, both as to adaption to workpieces of diverse shape and as to orientational capabilities. Versatility of the gripper, and ultimately the entire workhandling apparatus is a direct function of flexibility.

Both application flexibility and orientational capability are enhanced by a reduction in gripper size. Many applications upon internal surfaces require the gripper to enter the workpiece through a small hole and to reorient inside the cavity. A compact size obviously assists gripper entry into the cavity. A shorter gripper length also assists in reorienting the gripper inside the cavity. Additionally, a shortened gripper length also assists in reducing the moment arm which results whenever a manipulator is radially extended from its base.

Further, many prior art grippers are unreliable in hostile environments containing dirt or grit. The grit may interfere with the mechanical operation and may, through the course of time, render the gripper inoperative.

SUMMARY OF THE INVENTION

The invention concerns a gripping apparatus for use with a manipulator. The apparatus has a housing with an internal way system for reciprocably sliding an actuator block. A pair of fingers is pivotably supported upon the housing and laterally offset from the way system, one finger being upon each side of the way system. An actuator block is reciprocably moved within the way system under the impetus of compressive forces applied to each of its end sections. A mechanical linkage connected to the block between the end sections applys an input force to the end portions of each of the fingers. In the preferred embodiment, a pheumatic force is applied to each side of the actuator block and the pneumatic force is assisted and supplemented by a resilient force to make the actuator block monostable in the work clamp position.

BRIEF DESCRIPTION OF THE DRAWINGS

FIG. 3 is an elevational view of a cross-over finger arrangement which may be used on the gripper of FIG. 1 for grasping internal surfaces.

FIG. 4 is an end view of the cross-over finger arrangement of FIG. 3.

DESCRIPTION OF THE PREFERRED EMBODIMENT

Figure 1:
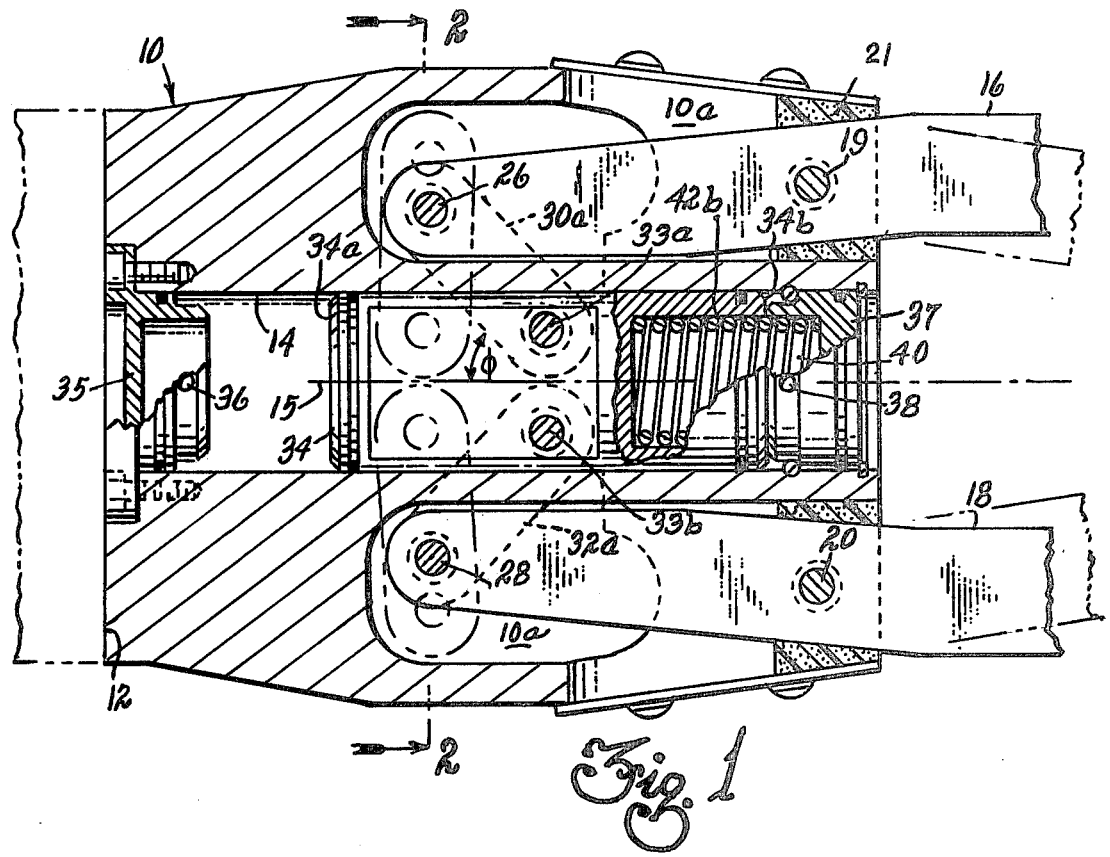
FIG. 1 illustrates a cross-sectional elevational view of a gripper utilizing one form of the present invention.

Referring specifically to FIG. 1, a gripping apparatus utilizing the present invention is illustrated in cross-section. The gripper has a bifurcated outer housing 10 which is rigidly attached to a mounting surface 12 of a manipulator or industrial robot (not shown). The housing 10 has an internal cylindrical cavity whose walls 14 define the periphery of an internal way system of circular cross-section having a center line 15. A pair of gripper fingers 16 and 18 is pivotally mounted to straddle the housing 10, a first finger 16 being pivoted about the axis of a pin 19 and a second finger 18 being pivoted about the axis of a pin 20. The axes of pins 19 and 20 are parallel to each other and perpendicular to the way system center line 15. The axes of the pins 19 and 20 are on opposite sides of the way system and center line 15 and equidistance therefrom. These axes are also equidistance from the manipulator mounting surface 12.

Figure 2:
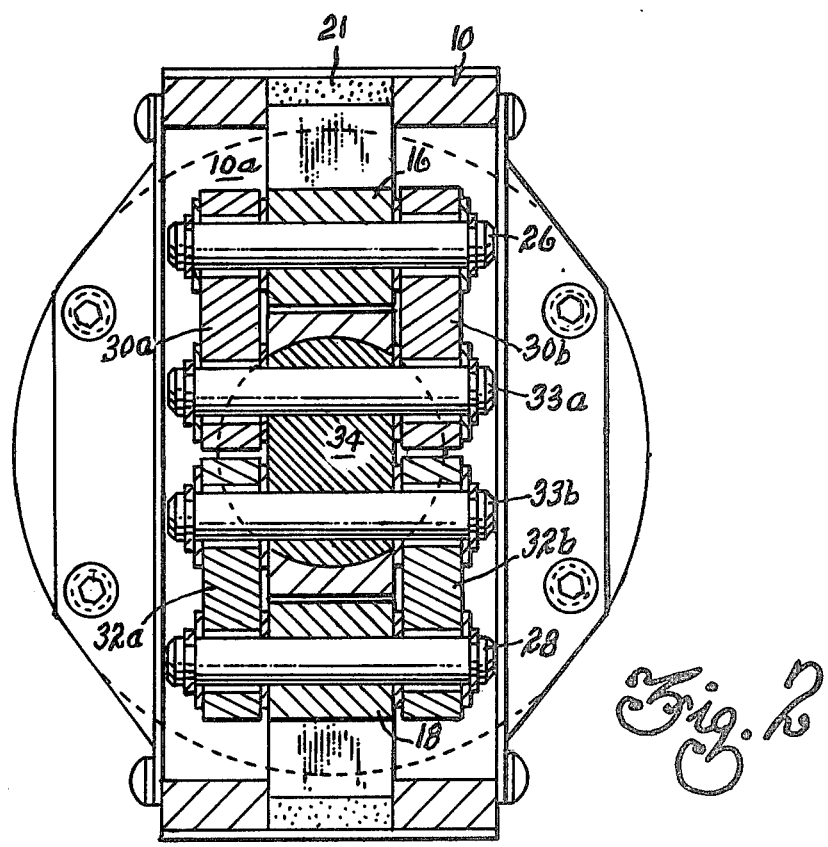
FIG. 2 is a cross-sectional end view of the gripper of FIG. 1 taken along the line 2—2.

Pins 26 and 28 extend through the interior portions of gripper fingers 16 and 19 respectively in a direction parallel to pins 19 and 20. Each of the pins 26 and 28 serves to pivot a pair of mechanical links, the pin 26 serving as a pivot for links 30a and 30b and the pin 28 serving as a pivot for links 32a and 32b. Links 30b and 32b are illustrated in FIG. 2.

The ends of mechanical links 30a, 30b, 32a and 32b distal to the gripper fingers 16 and 18 are also pivotally connected to pins 33a and 33b. The pins 33a and 33b pass through a piston-like actuator block 34 of generally cylindrical shape which is reciprocably movable within the internal way system under the impetus of pneumatic fluid pressure. The links 30a, 30b, 32a and 32b and their pivotal connections to pins 26, 28, 33a and 33b are arranged as a toggle. That is, as the actuator block 34 moves within the way system leftwardly from the position in FIG. 1, the links 30a, 30b, 32a and 32b tend to line up in a straight line at one point in their motion as they approach the slightly overcentered phantom position of the illustration. The toggle arrangement magnifies the input force to the actuator block 34 to produce an output force which is then input to pins 26 and 28 and the internal end of fingers 16 and 18 to rotate the fingers about their respective pivots 19 and 20. As should be apparent from the illustration in FIG. 1, the toggle arrangement attains a theoretical mechanical advantage defined by the equation:

$$F_o = \tfrac{1}{2} \tan \phi F_i$$

where $F_o$ is the output force of the actuator block 34 (or input force to the fingers, normal to centerline 15)

$F_i$ is the input force to the actuator block, along centerline 15) and $\phi$ is the included angle between one of the links 30a, 30b, 32a and 32b and the way system center line 15.

It can be seen that as the angle $\phi$ approaches 90°, the lengths 30a, 30b, 32a and 32b come into toggle and the mechanical advantage approaches infinity. In the real world, however, frictional forces and deformations prohibit the attainment of this theoretical advantage.

Nevertheless, the output force of the actuator block 34 (input to the fingers) is quite high.

In fact, the inherent springiness of each finger span between their respective pivot pins 19,26 and 20,28 permits the actuator block 34 to travel to an overcentered "self-locking" position, whence a workpiece is stably clamped.

The housing 10 also has an internal cavities 10a upon opposite sides the way system to permit the movement of respective fingers 16 and 18. A resilient material, for example foam rubber 21, closes the cavity 10a,b to outside contaminants in the vicinity of pivots 19 and 20, respectively, while permitting finger movement. Thus, the input portion of the gripper, from pivots 19 and 20 to the toggled arrangement of links 30a, 30b, 32a and 32b is completely enclosed to protect the input activating mechanism from contaminants, particularly particulate matter.

As mentioned above, the actuator block 34 is reciprocally moved within the internal way system under the impetus of fluid pressure. A fluid (compressed air in the preferred embodiment) is selectively communicated to the internal way system by two sets of orifices 36 and 38 (only one orifice of each set is illustrated) positioned upon opposite ends of the internal cavity about the periphery of abutments 35 and 37.

In the embodiment depicted in FIG. 1, a resilient biasing means, shown as a compression spring 40, abuts against abutment 37 and is fitted within an open-ended cavity within the actuator block 34 to urge the block leftwardly toward abutment 35. Fluid pressure is selectively applied to face 34a of the actuator block 34 to overcome the spring force and to move the actuator block 34 rightwardly in the illustration. Similarly, fluid pressure is selectively applied to the opposite endface of the actuator block, 34b, and to the internal actuator block cavity 42. The pressured fluid enters (and exits) the sets of orifices 36 and 38 and applies a compressive force to the respective axial faces 34a and 34b. Thus it should be apparent that the actuator block 34 performs not only the function of a sliding block, but also that of a piston, functions which are conventionally performed by separate elements. The spring bias against the actuator block 34 makes it monostable, i.e., in absence of the applied fluid pressure, the block 34 has but one stable position (to the left in FIG. 1).

As described, the gripper illustrated in FIG. 1 would be most suitable as an external gripper. The resilient spring member 40 would tend, should power be lost when the gripper is gripping the external surface of a workpiece, to maintain the relative position of the actuator block 34 within the way system (leftwardly in FIG. 1), thus maintaining the gripping force.

FIG. 3 illustrates a cross-over finger arrangement 50 which might be mounted to the fingers 16 and 18 in FIG. 1 to convert converging output motion into diverging motion for use in internal part handling. The arrangement includes a pair of intersecting converging-diverging finger extensions 54 and 56, each of the extensions having at least three discrete sections. The extension 56 has an inboard mounting section 56a having a mounting surface 53. The mounting surface 53 is mated to a complementary surface 18a of the finger 18. A cross-over section 56b extends obliquely inward from the mounting section and transverses an extension of the way system centerline 15 to an outboard support section 56c, the outboard support section 56c being angled from the cross-over section by an equal but opposite angle from the mounting section 56a. A spacer 57 is attached to the outboard support section 56c and contains a pair of pins 57a and 57b (see FIG. 4) used to engage the internal surface of a workpiece (shown in phantom).

Quite similarly, the finger extension 54 has a mounting surface 52 mated to a complementary surface 16a upon finger 16. A cross-over section 54b also extends obliquely inward from the mounting section transversing the way system centerline 15 to an outboard support section 54c. The cross-over section 54b, however, extends through a slot 60 in its complementary cross-over section 56b.

As should be apparent from the above description and clearly depicted, the cross-over arrangement converts converging output of the fingers 16 and 18 into diverging output of the extensions 54 and 56. This arrangement permits the gripper to be used internally while still benefiting from the self-locking aspect of the toggle arrangement.

Persons of skill in the art will readily appreciate the multiple advantages of the present invention. As mentioned above, the fully enclosed internal way system protects the actuator mechanism from contaminates present in the working environment, such as chemical powders, grit and dust. The use of a monostable piston-like actuator block 34 eliminates the requirement of a separate piston and accompanying disadvantages, as for example the lack of rigidity in the piston rod of a separate piston. The actuator block 34 also results in a more compact assembly which will ultimately increase the manipulator's positional and orientational flexibility as well as increase load carrying capability.

The use of the internal cavity 14 of housing 10 as the cylinder also eliminates the need for a separate cylinder housing. This arrangement permits a piston of larger net end surface area, a feature which is particularly advantageous when large gripping forces are required or when the pressurized fluid source has limited pressure—a situation which is common when preexisting shop air is utilized. Since reducing the pressure from the source is a simple matter, the gripper of the present invention also provides greater flexibility from a force standpoint.

Although the present invention has been described in conjunction with the preferred embodiment, it is to be understood that modifications and variations may be resorted to without departing from the spirit of the invention as those skilled in the art will readily understand. Such modifications and variations are considered to be within the view and scope of the present invention as defined by the appended claims.

What is claimed is:

1. An apparatus for grasping objects, comprising:
   (a) a gripper housing having an enclosed internal way system;
   (b) a pair of fingers pivotally supported in said housing, each of the fingers being on opposite sides of the way system with respect to the other;
   (c) an actuator block slidably fitted into said way system for axial movement therethrough, said block having two axial end portions adapted to receive an actuator input force;
   (d) a mechanical linkage pivotally connecting a portion of the actuator block disposed between said axial end portions to a portion of each of said fingers offset from the finger pivot for applying a gripper input force to each finger as the actuator block undergoes axial movement; and (e) means for selectively applying a compressive actuator input force to the axial end portions of the actuator block to slide said block in said way system.

2. An apparatus as recited in claim 1 wherein said compressive actuator input force means includes a resilient biasing means bearing against one of the axial end portions tending to axially move the actuator block to a predetermined position within the way system.

3. An apparatus as recited in claim 1 wherein said compressive actuator input force means includes a fluid port within said way system for selectively applying fluid pressure to said actuator block.

4. An apparatus as recited in claim 1 wherein said compressive input force means includes fluid ports within said way system for selectively applying fluid pressure to each of the axial end portions of the actuator block, and a resilient biasing means bearing against one of said axial end portions tending to move the actuator block in a predetermined direction.

5. An apparatus as recited in claim 1 wherein said mechanical linkage is fully enclosed within the gripper housing.

6. An apparatus as recited in claim 1 wherein the way system has a substantially circular cross-section.

7. An apparatus as recited in claim 6 wherein the periphery of said way system is defined by the walls of said gripper housing.

8. An apparatus as recited in claim 1 wherein said mechanical linkage amplifies the actuator input force and applies said amplified force to said offset portion of said fingers.

9. An apparatus as recited in claim 1 wherein said way system has a substantially cylindrical configuration, and a portion of each of the fingers distal to said mechanical linkage, opposite the finger pivots, transverses an extension of the way system centerline.

10. An apparatus as recited in claim 9 wherein one of said distal finger portions passes through a slot in the distal portion of the other finger.

11. An apparatus for grasping objects, comprising:
 (a) a gripper housing, having a cylindrical bore;
 (b) a pair of end caps, closing the ends of said bore;
 (c) a pair of elongate gripper fingers, supported on pivot joints in said housing, each of the fingers being on opposite sides of said bore with respect to the other;
 (d) a piston block, slidably received in said bore, said block having two opposite end portions forming expansible end chambers with said bore and said end caps;
 (e) a mechanical toggle linkage, pivotally connecting a portion of said piston block between said end portions to a portion of each of said gripper fingers offset from the finger pivot joints, for applying a gripper input force to each finger as said piston block undergoes axial movement;
 (f) a spring, disposed in said bore between one of said end portions and its corresponding end cap, said spring tending to bias said piston block in a predetermined direction;
 (g) a plurality of fluid ports, communicating with said expansible end chambers and a fluid source, to effect axial movement of said piston block.

* * * * *